US010445561B2

United States Patent
Tomlinson et al.

(10) Patent No.: US 10,445,561 B2
(45) Date of Patent: Oct. 15, 2019

(54) BINDING DATA TO A PERSON'S IDENTITY

(71) Applicant: PQ Solutions Limited, London (GB)

(72) Inventors: Martin Tomlinson, Totnes (GB); Cen Jung Tjhai, London (GB); Andersen Cheng, London (GB)

(73) Assignee: PQ SOLUTIONS LIMITED, London (GB)

( * ) Notice: Subject to any disclaimer, the term of this patent is extended or adjusted under 35 U.S.C. 154(b) by 172 days.

(21) Appl. No.: 15/711,311

(22) Filed: Sep. 21, 2017

(65) Prior Publication Data
US 2018/0247111 A1    Aug. 30, 2018

(30) Foreign Application Priority Data

Feb. 28, 2017    (GB) .................................. 1703169.1

(51) Int. Cl.
| | | |
|---|---|---|
| *G06F 21/32* | (2013.01) | |
| *G06K 9/00* | (2006.01) | |
| *G06T 11/00* | (2006.01) | |

(52) U.S. Cl.
CPC ......... *G06K 9/00268* (2013.01); *G06F 21/32* (2013.01); *G06K 9/00248* (2013.01); *G06T 11/00* (2013.01)

(58) Field of Classification Search
CPC ...... G06F 21/32; G06F 21/62; G06F 21/6209; H04L 9/006; H04L 9/0861; H04L 9/0863; H04L 9/3226; H04L 9/3231; H04L 2209/043; G06K 9/00221; G06K 9/00248; G06K 9/00268
See application file for complete search history.

(56) References Cited

U.S. PATENT DOCUMENTS

| | | | | |
|---|---|---|---|---|
| 6,421,453 B1* | 7/2002 | Kanevsky | ............. | G06F 21/316 340/5.2 |
| 6,526,161 B1* | 2/2003 | Yan | .................... | G06K 9/00281 382/118 |
| 7,606,768 B2* | 10/2009 | Graubart | ............ | G06Q 20/3821 705/51 |
| 8,934,665 B2* | 1/2015 | Kim | .................... | G06K 9/00268 382/103 |
| 9,336,779 B1* | 5/2016 | Patel | ....................... | G06F 21/36 |
| 9,563,270 B2* | 2/2017 | Tichenor | ................. | G06F 3/012 |

(Continued)

OTHER PUBLICATIONS

Bian et al. "Facial Position and Expression-Based Human-Computer Interface for Persons With Tetraplegia" [Online], May 2016 [ Retrieved on: Jun. 2, 2019], IEEE JBHI vol. 20 No. 3, Retrieved from: < https://ieeexplore.ieee.org/stamp/stamp.jsp?tp=&arnumber=7058374 > (Year: 2016).*

*Primary Examiner* — Eric W Shepperd
(74) *Attorney, Agent, or Firm* — Morris & Kamlay LLP (57) ABSTRACT

Methods and systems are described for creating irrefutable binding data for a data file. An input sequence of data elements is derived based on information from the data file. A graphical representation of input regions corresponding to the input sequence of data elements is output on a display, superimposed on captured image data including a visible feature of a user associated with the data file. User input of each data element of the input sequence is captured by tracking the visible feature through the corresponding input regions, and the binding data is created from the captured images as the visible feature is tracked through the input regions.

20 Claims, 6 Drawing Sheets

(56) References Cited

U.S. PATENT DOCUMENTS

| | | | | |
|---|---|---|---|---|
| 2004/0017472 | A1* | 1/2004 | Gorodnichy | G06F 3/012 348/169 |
| 2004/0240708 | A1* | 12/2004 | Hu | G06F 3/012 382/103 |
| 2010/0211397 | A1* | 8/2010 | Park et al. | G10L 17/26 704/276 |
| 2012/0038546 | A1* | 2/2012 | Cromer | G06F 1/1626 345/156 |
| 2013/0016103 | A1* | 1/2013 | Gossweiler, III | G06K 9/00261 345/428 |
| 2013/0267204 | A1* | 10/2013 | Schultz | H04W 12/06 455/411 |
| 2013/0304590 | A1* | 11/2013 | Motenko | G06Q 50/12 705/15 |
| 2015/0172286 | A1* | 6/2015 | Tomlinson | H04L 63/0861 726/7 |
| 2017/0061034 | A1* | 3/2017 | Ritchey | G16H 40/63 |
| 2017/0185807 | A1* | 6/2017 | Dow | G06F 21/83 |
| 2017/0324726 | A1* | 11/2017 | Alleaume | G06F 21/35 |
| 2018/0158060 | A1* | 6/2018 | Adams | G06Q 20/409 |

* cited by examiner

BINDING DATA TO A PERSON'S IDENTITY

FIELD OF THE INVENTION

This invention relates to data processing, and more particularly to verification of data integrity and associated user identity.

BACKGROUND OF THE INVENTION

Providing proof that transmitted or stored electronic data was originated by a particular user and has not been tampered with since or substituted with a forgery is not an easy problem to solve.

Authentication of public keys used to encrypt original data is traditionally done using certificates whereby a trusted third party (TPA) acts as a Certification Authority (CA) and publishes public keys and their associated owner's identities (ID's) in the form of certificates. These certificates are digitally signed using the private key of the CA so that the authenticity of a certificate may be checked by anyone using the public key of the CA.

The binding of the ID with the public key is an important issue. There are several problems with the CA approach. A central server has to be constantly available, accessible under varying traffic conditions and hacker proof. Strict security procedures need to be followed by the CA to check ID's before issuing each certificate. Also procedures need to be in place to prevent tampering of certificates. The CA has to have credible trustworthiness. Apart from checking the digital signature a user cannot directly verify the associated ID of a public key.

Moreover, much of current day electronic communications involves digital files and in the case of encrypted communications the encryption and decryption keys are usually stored as digital files. In many applications it is necessary to bind one or more digital files to the identity of an individual who is designated as the originator, owner or administrator of said files. An example of particular importance is the binding of a public encryption key or any shared secret to an individual to prevent impersonations such as Man In The Middle (MITM) attacks.

What is desired are improved techniques to provide an irrefutable association or binding of a person's identity with transmitted data.

Statements of the Invention

Aspects of the present invention are set out in the accompanying claims.

According to one aspect, the present invention provides a method of creating irrefutable binding data for a data file, comprising: deriving an input sequence of data elements based at least on information from the data file; outputting, on a display, a graphical representation of input regions corresponding to the input sequence of data elements, superimposed on captured image data including a visible feature of a user associated with the data file; capturing user input of each data element of the input sequence by tracking the visible feature through the corresponding input regions, and creating the binding data from at least some of the captured images as the visible feature is tracked through the input regions.

Capturing user input of each element of the input sequence may comprise: outputting a prompt of an element from the input sequence; detecting the visible feature in the captured image data; computing two-dimensional coordinates of the visible feature detected in the captured images; and identifying the element of the input sequence corresponding to the computed two-dimensional coordinates of the visible feature. Advantageously, this facilitates input of the input sequence elements in a more secure and effective way, as the user does not have to read out the prompted elements aloud and capture of the user input remains operational in noisy environments.

Identifying the element of the input sequence may comprise determining that the computed two-dimensional coordinates of the visible feature is within an associated input region of the graphical representation. Identifying the element of the input sequence may comprise determining that the computed two-dimensional coordinates of the visible feature remain within the associated input region of the graphical representation for a defined duration.

The binding data may comprise at least one captured image corresponding to user input of each data element of the input sequence. The input sequence of data elements may be derived by extracting a portion of the information from the data file or calculating derived information from the data file using a defined mathematical function.

The data file and the associated binding data may be transmitted to a recipient, for verification of the implanted input sequence of data elements from said received binding data, and determination of the identity of the user associated with the data file from the received binding data.

The implanted input sequence of data elements may be determined from an output of the captured images received by the recipient, for verification of the integrity of the associated data file. The implanted input sequence of data elements may be compared to a corresponding input sequence of data elements derived from the received data file, to verify the integrity of the associated data file. The identity of the originator may be determined by a recipient device performing facial recognition processing of the received captured images.

Alternatively, the identity of the originator may be determined by the recipient recognizing characteristics of the user from the output of the received captured images. Advantageously, such an arrangement facilitates increased security confidence levels, since the amount of distortion of the user's face in the captured image frames may be correlated to the amount of movement of the user inputting the prompted sequence. By prompting the user to move about the camera's field of view to input elements of the input sequence, each individual image frame is less likely to produce a clear and static view of the user's face for fraudulent reproduction and/or feature recognition/replication, thus improving the confidence level.

Each element may comprise one or more of alphanumeric characters, symbols, and icons. Each element may represent a respective plurality of bits derived from the data file. Each element may be retrieved from a lookup table, where a symbol or sequence of symbols is used to describe said respective plurality of derived bits.

The data file may be a cryptographic key, where a portion of said cryptographic key is implanted into said binding data. The implanted portion of the cryptographic key and the identity of the entity associated with the cryptographic key may be verified from said binding data, before allowing encryption or decryption of data using said received cryptographic key.

The binding data may be stored in a server for retrieval by a recipient of the associated data file.

The digital file may comprise a plurality of said binding data used for authentication, to form a nested authentication arrangement whereby successive trusted third parties provide a respective binding data.

A graphical element may be output at the tracked location of the visible feature, wherein the graphical representation of input regions is output over the graphical element. The visible feature may be the nose of a user's face, and the graphical element may be generated based on the size and shape of the user's face. Advantageously, this enables the system to utilize an imprecise feature tracking algorithm to achieve greatly improved computational efficiencies, without sacrificing input accuracy. As a further benefit, users may prefer to shield their captured face from over-the-shoulder capture during the binding data generation process.

According to another aspect, the present invention provides a method of verifying a digital fingerprint of a received data file, comprising: retrieving a sequence of captured images from the digital fingerprint, each captured image including a visible feature of a user associated with the data file; determining an implanted input sequence of data elements from an output of the captured images received by the recipient, each captured image including the visible feature at a respective input region of a graphical representation of input regions corresponding to a sequence of data elements derived from the source data file as transmitted; verifying the implanted input sequence of data elements against the received data file; and determining the identity of the user associated with the received data file from the captured images.

The determined implanted input sequence may be compared to a corresponding input sequence of data elements derived from the received data file, to verify the integrity of the associated data file. The input sequence may be derived from the received data file using a defined algorithm. The identity of the originator may be determined by a recipient device performing facial recognition processing of the received captured images. The identity of the originator may be determined by the recipient recognizing characteristics of the user from the output of the received captured images.

In further aspects, the present invention provides a system and apparatus comprising one or more processors configured to perform the above methods. In yet other aspects, there is provided a non-transitive computer-readable storage medium storing one or more computer programs arranged to carry out the above methods when executed by a programmable device.

BRIEF DESCRIPTION OF THE DRAWINGS

There now follows, by way of example only, a detailed description of embodiments of the present invention, with references to the figures identified below.

DETAILED DESCRIPTION OF EMBODIMENTS OF THE INVENTION

A specific embodiment of the invention will now be described for a process of creating irrevocable binding data for a digital data file. Referring to the schematic block diagram of FIG. 1, a data processing system 1 according to the present exemplary embodiment comprises an augmented reality (AR) device 3 that is configured to analyze acquired images of a user and overlay information to provide an input interface 5 in the perspective of the user, for input of fingerprint data derived from the original data file 7. Binding data 9 is generated by the AR device 3, including captured image frames of the user as each element of the fingerprint data is input via the input interface 5. The resulting binding data 9 thereby provides an irrevocable binding of information from the original data file to biometric characteristics of the user, by implanting the fingerprint data into the captured images in the binding data 9. Advantageously, the binding data 9 can be used to verify both the integrity of data file 7, for example as received at a recipient device 11 via a server 13 and/or a data network 15, as well as the identity of the user purporting to transmit the data file 7. The data network 15 may comprise a terrestrial cellular network such as a 2G, 3G or 4G network, a private or public wireless network such as a WiFi™-based network and/or a mobile satellite network or the Internet.

Figure 1:
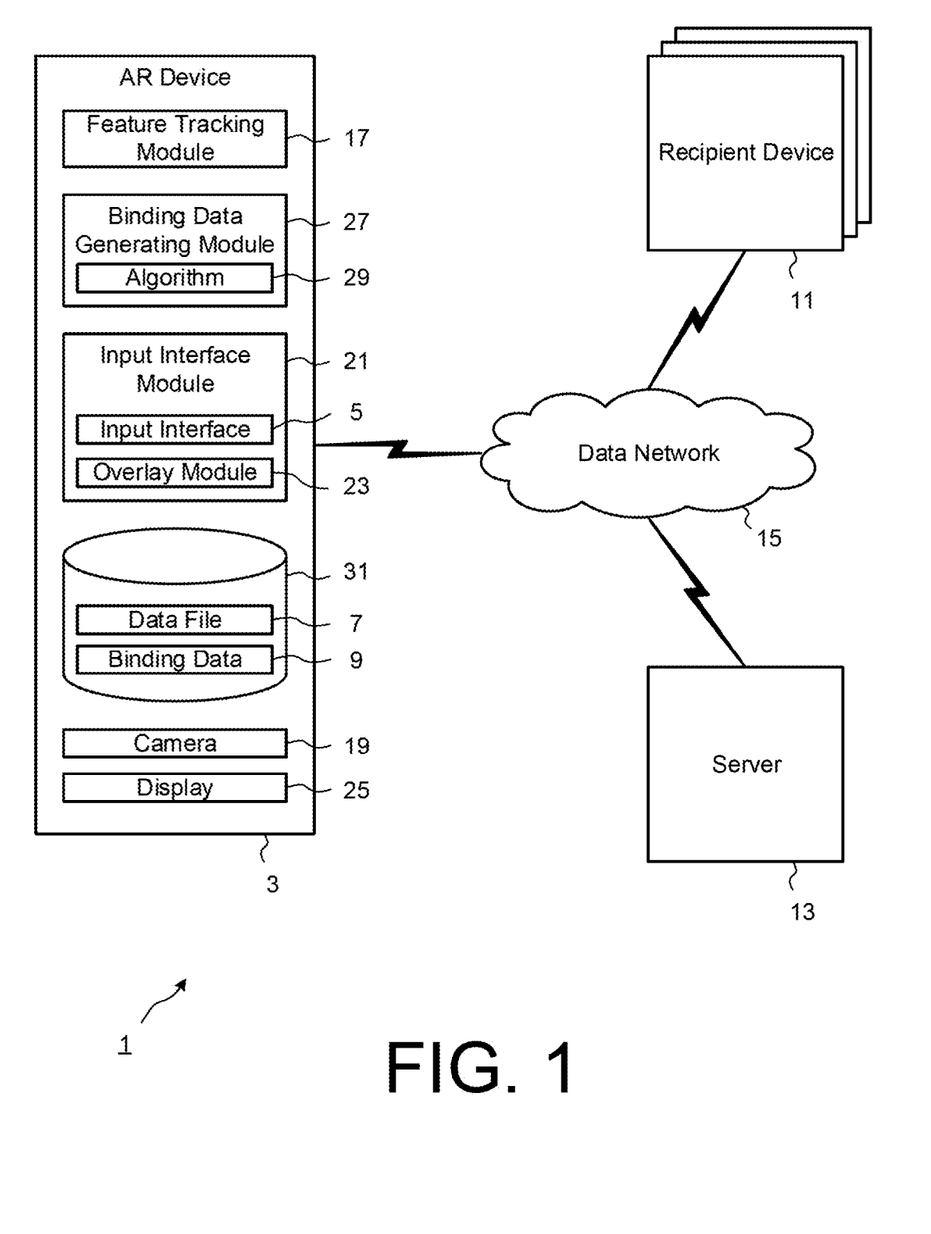
FIG. 1 is a block diagram showing the main components of a data processing system according to an embodiment of the invention.

The AR device 3 includes a feature tracking module 17 to perform image processing on image data captured by a camera 19, to detect and track the location of one or more visible features of the user, such as the user's face and/or nose, in the captured image frames. An input interface module 21 of the AR device 3 overlays information using an overlay module 23, to provide the input interface 5 superimposed on each captured image frame, which is output as augmented image data to a display 25. A visible feature of the user, such as the nose, may be designated as a virtual pointer for the input interface 5. The input interface module 21 may also be configured to generate and overlay a graphical element at the tracked location of one or more visible features. For example, a virtual mask image may be generated based on the detected size, shape and orientation of the user's face feature, and superimposed in the output augmented image data. Alternatively or additionally, a virtual pointer image may be generated based on the detected size and shape of the user's nose feature, and superimposed in the output augmented image data.

A binding data generating module 27 of the AR device 3 derives an input sequence of data elements from information in the data file 7 and outputs prompts for user input of each element using the superimposed input interface 5. The input sequence of data elements may comprise alphanumeric characters, symbols and/or icons corresponding to the fingerprint data derived from the data file 7, for example based on an algorithm 29 implemented by the binding data generating module 27. The algorithm 29 may be a defined mathematical function, such as a hash function based on some or all of the information stored in the data file. As another example, the algorithm may define portions of the data file to be retrieved as elements of the input sequence. Preferably, the derived elements of fingerprint data provide a unique digital signature of the original data file that can be verified against fingerprint data derived from a subsequent copy or version of the data file. Additionally, each data element of the input sequence may represent a respective plurality of bits derived from the original data file. For example, each element may be retrieved from a lookup table, where a replacement symbol, a sequence of symbols, a word, or a phrase is used to describe a respective character or bit pattern. Advantageously, the increased redundancy further reduces the risk of error by the recipient in recovering the fingerprint data and also makes the task of forging the binding data that much harder.

Figure 2:
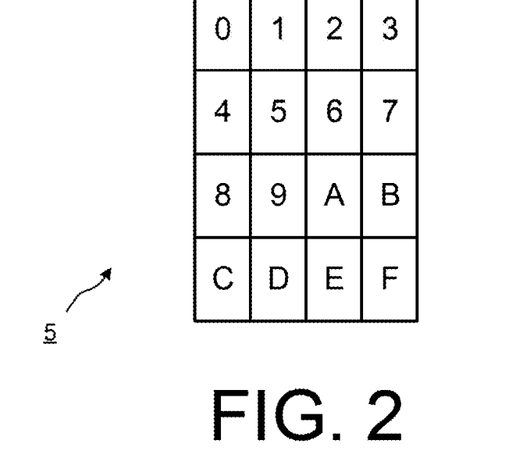
FIG. 2 is a block diagram schematically illustrating an example of an input interface to be superimposed on captured image data.

The input interface 5 includes a graphical representation of one or more input regions superimposed on each captured image frame, the or each input region corresponding to a respective one of the elements of the derived input sequence. FIG. 2 schematically illustrates an exemplary input interface 5 comprising sixteen input regions arranged in a two-dimensional grid. Purely by way of example, each input region in this example is labelled with a respective alphanumeric character from the set {0,1,2,3,4,5,6,7,8,9,A,B,C,D,E,F}, corresponding to possible elements of a input sequence derived using a hexadecimal (base 16) encoded hash function. In an embodiment, the labels are not displayed in the input interface 5 and instead, a graphical element may be overlaid to prompt the user to move his or her designated pointer feature to a corresponding region of the display 25. Alternatively, the location of the labelled input regions may be dynamic. As yet another modification, the input interface 5 may include a subset of the possible input regions, including the input region corresponding to the next element from the sequence to be input by the user.

The binding data generating module 27 adds captured image frames to the generated binding data 9, the image frames including the image data of the user interacting with the superimposed input interface 5 output on the display 25. The resulting binding data 9 may comprise a collection of individual image frames corresponding to user input of a respective element, for example as each element of the fingerprint data is input via the input interface module 21. Alternatively, the binding data 9 may comprise a video stream of captured image frames as the user is interacting with the superimposed input interface to input the sequence of elements. The image frames added to the binding data 9 may include the superimposed input interface 5. The original data file 7 and associated binding data 9 may be stored in a memory 31 of the AR device 3, such as RAM working memory.

The AR device 3 may be in the form of a mobile phone device having a camera providing an AR capability, or may be a wearable device, such as glasses having AR capabilities, or may be another form of device which can provide AR processing and overlay displayable to the user. The devices 3,11 may be associated with respective registered users of the system 1, the server 13 storing data identifying each registered user in a database (not shown). It will be appreciated that a plurality of devices 3,11 are operable concurrently within the system 1, and that each device 3,11 may typically be configured to perform the functionality of generating and transmitting binding data for a data file, as well as verifying received binding data of a data file. Preferably the operations are conducted in real time, or near real time.

Figure 3:
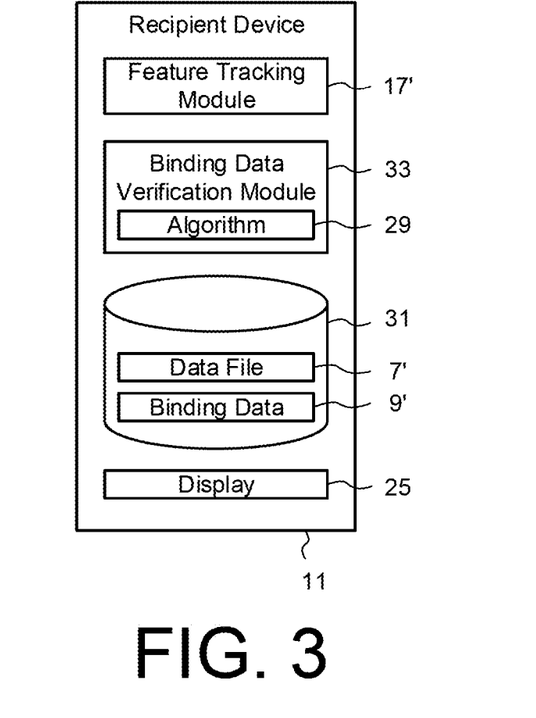
FIG. 3 is a block diagram showing the main components of an exemplary recipient device according to an embodiment of the invention.

Referring to FIG. 3, the schematic block diagram illustrates an exemplary embodiment of a recipient device 11 configured to verify a received data file 7' and associated binding data 9', using corresponding reference numerals to those of the preceding figure where appropriate for corresponding elements. As will be appreciated, the received data file 7' and/or associated binding data 9' may not be identical to the original data file 7 and associated binding data 9 as generated by the transmitting AR device 3, for example due to transmission errors and/or intervening acts by a fraudster that result in modified portions of the data as received. By processing the received data, the recipient device 11 can efficiently and effectively verify both the integrity of received data file 7' as well as the identity of the user purporting to transmit the original data file 7.

In this embodiment, a binding data verification module 33 of the recipient device 11 automatically recovers the input sequence of elements from the sequence of captured image frames in the received binding data 9'. For example, the feature tracking module 17' may detect and track the location of the visible feature designated as the virtual pointer through the sequence of captured image frames in the received binding data 9'. The binding data verification module 33 may correlate the detected locations with the input regions of the input interface 5 superimposed on each captured image frame, to determine corresponding elements of the sequence as input by the transmitting user. The binding data verification module 33 may compare the recovered sequence to a corresponding sequence of data elements derived from the received data file 7', to verify the integrity of the associated data file 7'.

The feature tracking module 17' of the recipient device 11 may be configured to carry out facial recognition image processing on at least one of the image frames in the received binding data 9' to automatically verify that the identified sender of the data file is the user who interacted with the input interface module 21 of the AR device 3 to generate the binding data 9. Additionally or alternatively, the recipient user may authenticate the identity of the purported sender by recognizing him as the person in the captured image frames as output on the display 25, for example by recognizing known visible characteristics of the user, such as facial appearance, distinctive gestures, etc.

The data processing performed by the AR device 3 in the system 1 will now be described in more detail with reference to flow diagram of FIG. 4, which shows the steps of an example computer-implemented process of generating binding data for a digital data file according to an embodiment. While the various steps in this flowchart are presented and described sequentially, it will be apparent that some or all of the steps may be executed in different orders, may be combined or omitted, and some or all of the steps may be executed in parallel. Reference is also made to FIGS. 5A-5H showing an exemplary sequence of output display screens during the user input process of FIG. 4.

Figure 4:
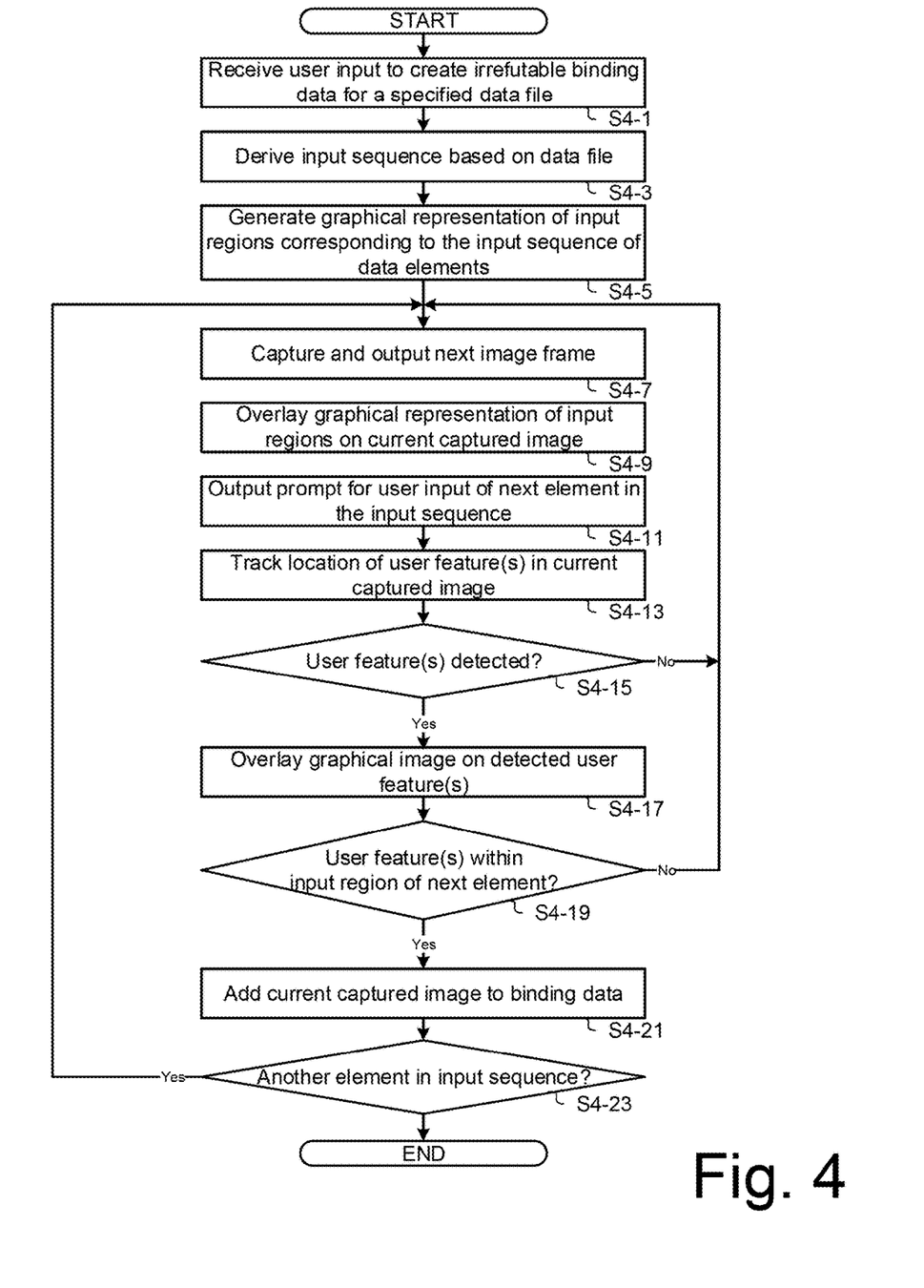
FIG. 4 is a flow diagram showing steps of an exemplary process of generating binding data for a digital data file according to an embodiment.

As shown in FIG. 4, the process begins at step S4-1 where the AR device 3 receives user input to create irrefutable binding data for a specified data file. This may be in the form of a specific command via a user interface of AR device 3, or as a procedural call from an application running on the AR device 3 prior to transmission of a data file to a corresponding application on a recipient device 11. The data file may be any form of data file containing information in digital form. Purely as one example, the data file may be a digital document to be transmitted by an electronic communications application, such as a messaging or e-mail application, to a recipient, for example via a corresponding electronic communications server 13. As another example, the data file may be a cryptographic key, and may further include auxiliary data consisting of the originator's ID, a time stamp, type of document and any other forms of metadata. A recipient device 11 may verify the implanted portion of the cryptographic key and the identity of the entity associated with the cryptographic key from the received binding data, before allowing encryption or decryption of data using the received cryptographic key. As yet another example, the data file may be a transaction request, including auxiliary information associated with a transaction between the AR device 3 and a transaction server 13, which may be information linked to the transaction data, such as one or more of a unique identifier of the transaction generated by the server 13 or a transaction application of the AR device 3, a time stamp, session ID, and/or information that is derived from the transaction, such as a digital fingerprint, signature or hash value that is computed from predefined data aspects of the transaction data.

At step S4-3, the binding data generating module 27 derives an input sequence based on the data file 7, using the defined algorithm 29. Purely by way of example, the hexadecimal hash value '9152B' may be computed from part or all of the information stored in the data file 7, defining an input sequence of five alphanumeric data elements. As another example, the algorithm 29 may define characters to be retrieved from specified locations in the computed hash value, or from the content of the data file itself. As yet a further example, the algorithm 29 may define a codebook lookup table to replace defined characters or sequences of characters or bits with corresponding unique symbols, words, phrases, etc. At step S4-5, the input display processing module generates a graphical representation of input regions corresponding to the derived input sequence of data elements. Alternatively, the input display processing module may be configured with a predefined graphical representation of input regions. In this exemplary embodiment, the graphical representation is based on a two-dimensional grid of input regions as schematically illustrated in FIG. 2.

Figure 5A:
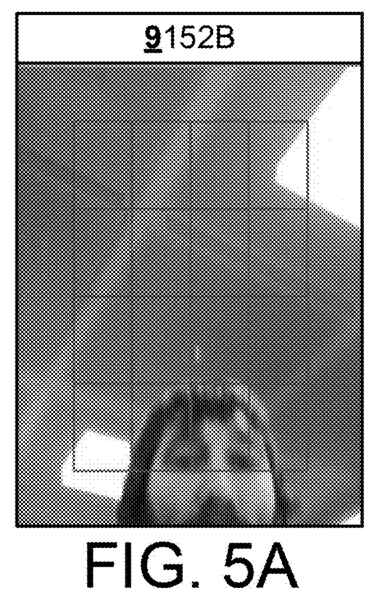
FIGS. 5A-5H show an exemplary sequence of output display screens during the user input process of FIG. 4.

At step S4-7, the input display processing module captures an input image frame using the camera and outputs the captured image frame on the display. At step S4-9, the overlay module overlays the graphical representation of input regions over the current captured image. FIG. 5A is an example of an output display showing the grid of input regions superimposed as an overlay over a current captured image frame. At step S4-11, the input interface module 21 outputs a prompt for user input of the first element in the input sequence. The exemplary input sequence '9152B' is also shown in the example of FIG. 5A, displayed in a prompt region at the top of the captured image frame. The first data element '9' is highlighted as the input prompt, schematically illustrated with bold and underline emphasis. Any other graphical form of highlighting may be used.

At step S4-13, the feature tracking module 17 performs image processing to determine and track the location of one or more visible user features in the current captured image frame. In this exemplary embodiment, the defined user features are the user's face and nose features. Image processing techniques for locating the face and nose positions in the captured image data are generally well-known per se and need not be described further. The determined location of the or each visible feature may be defined as two-dimensional coordinates relative to the captured image frame of reference. The location may be determined from coordinates of a bounding box of the or each detected feature, for example as the centre of the bounding box.

Figure 5B:
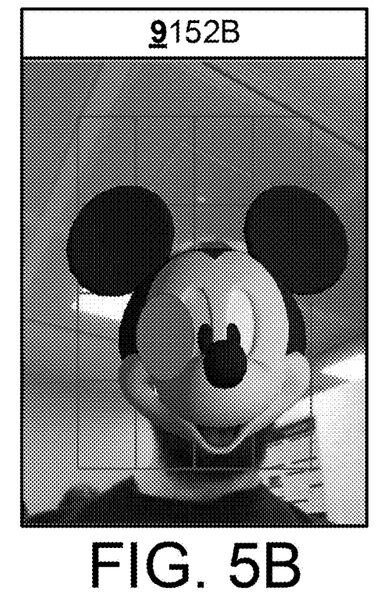

At step S4-15, the input interface module 21 determines if the feature tracking module 17 detected the defined user features. If tracking was not successful, for example if the user's face is not within the camera's field of view as in the example of FIG. 5A, processing returns to step S4-7 where another input image frame is captured and processed to track the location of the user's face and nose. When it is determined at step S4-15 that the user features are detected in a captured image frame, the overlay module 23 of the input interface module 21 may be configured to overlay a graphical image over the detected user features, at step S4-17. FIG. 5B shows an example of the output display after the input interface module 21 has generated and superimposed a virtual cartoon mask image based on the location, size, shape and orientation of the user's face feature as detected by the feature tracking module 17. Advantageously, this provides the user with a greater sense of data security.

Figure 5C:
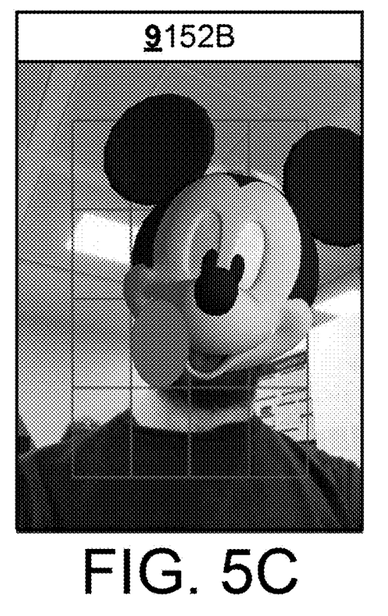
Figure 5D:
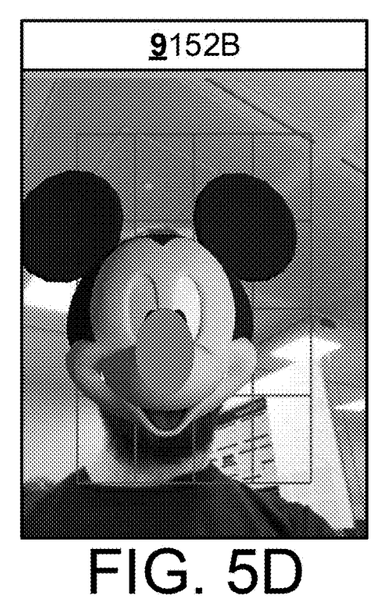
Figure 5E:
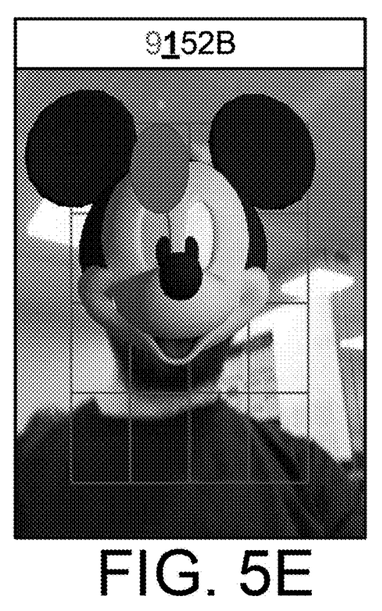
Figure 5F:
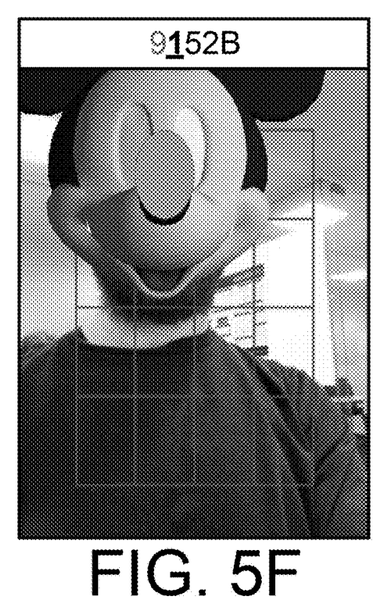
Figure 5G:
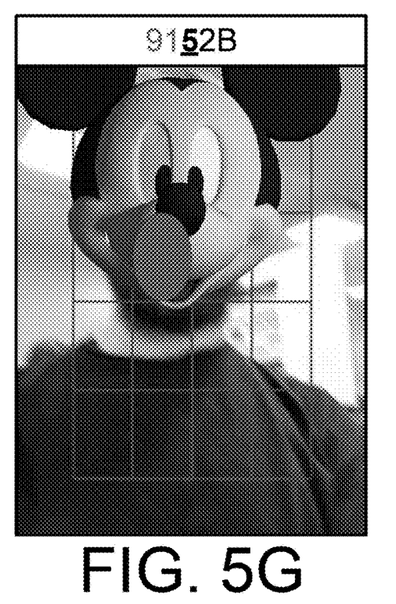
Figure 5H:
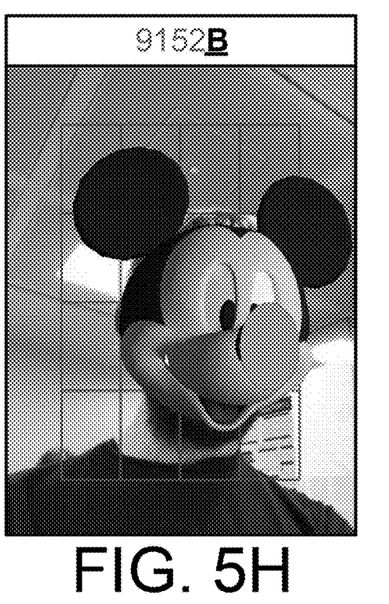

In this example, the mask image is shown as an overlay on the grid of input regions but it will be appreciated that the ordering of overlaid graphical elements may be reversed. FIG. 5B also shows a further exemplary overlaid graphical element serving as an alternative or additional output prompt for the user to orientate his or her nose as a virtual pointer to the particular input region corresponding to the next element of the sequence to be input via the input interface 5. FIG. 5C shows an example of a subsequent output display after the user's face has changed location and orientation within the captured image frame. The superimposed virtual cartoon mask image is updated to match the current location, size, shape and orientation of the user's face feature as detected by the feature tracking module 17.

At step S4-19, the input interface module 21 determines if the tracked location of the user's nose feature, which is designated as the virtual pointer in this exemplary embodiment, is within the input region corresponding to the first element in the input sequence. The input interface module 21 may compute the two-dimensional coordinates of the visible nose feature detected in the captured images, and determine that the computed two-dimensional coordinates of the visible feature is within an associated input region of the graphical representation. For example, referring to the example output display shown in FIG. 5D, the location of the user's nose feature is identified by the feature tracking module 17, and compared to input interface 5 to identify the overlapping input region. The input interface module 21 determines that user input of the prompted element of the input sequence is complete when the designated virtual pointer is within the corresponding input region of the input interface 5.

Optionally, the input display processing module may be configured to determine that the tracked feature remains within the associated input region of the graphical representation for a defined duration, such as three seconds. The additional output prompt may be updated to indicate a count down or timer of the defined duration. Referring again to the example of FIG. 5D, the output prompt that is superimposed on the mask image and the grid of input regions may change colour as the user holds the position of his or her nose within the correct input region, as prompted.

If it determined at step S4-19 that the user's nose is no longer within the input region of the first element in the input sequence, then processing returns to step S4-7 where another input image frame is captured and processed to track the location of the user's face and nose. On the other hand, if it is determined at step S4-19 that user input of the first element in the input sequence is complete, then at step S4-21, the binding data generating module 27 adds the current captured image to the binding data file 7. The image data added to the binding data may include the superimposed input interface 5, for example the grid of input regions. Alternatively, the binding data generating module 27 may initiate video data recording of all captured image frames as the user is interacting with the superimposed input interface 5 to input the data elements of the input sequence, and add the video stream of captured image frames to the binding data 9 after user input of the entire input sequence is completed.

At step S4-23, the binding data generating module 27 determines if there is another element in the input sequence to be processed for user input, and processing returns to steps S4-7 to S4-21 until all of the elements in the input sequence have been processed and respective captured images are added to the binding data file 9. FIGS. 5E-5H show a further sequence of example display screens output by the AR device 3 as the user progresses through prompted input of the remaining data elements in the input sequence. The AR device 3 may then transmit the data file 7 together with the generated binding data file 9 to a recipient device 11. Optionally, the server 13 may store the data file 7 and the corresponding binding data file 9 in one or more databases (not shown), for subsequent retrieval and verification by the AR device 3 and/or a recipient device 11.

Computer Systems

Figure 6:
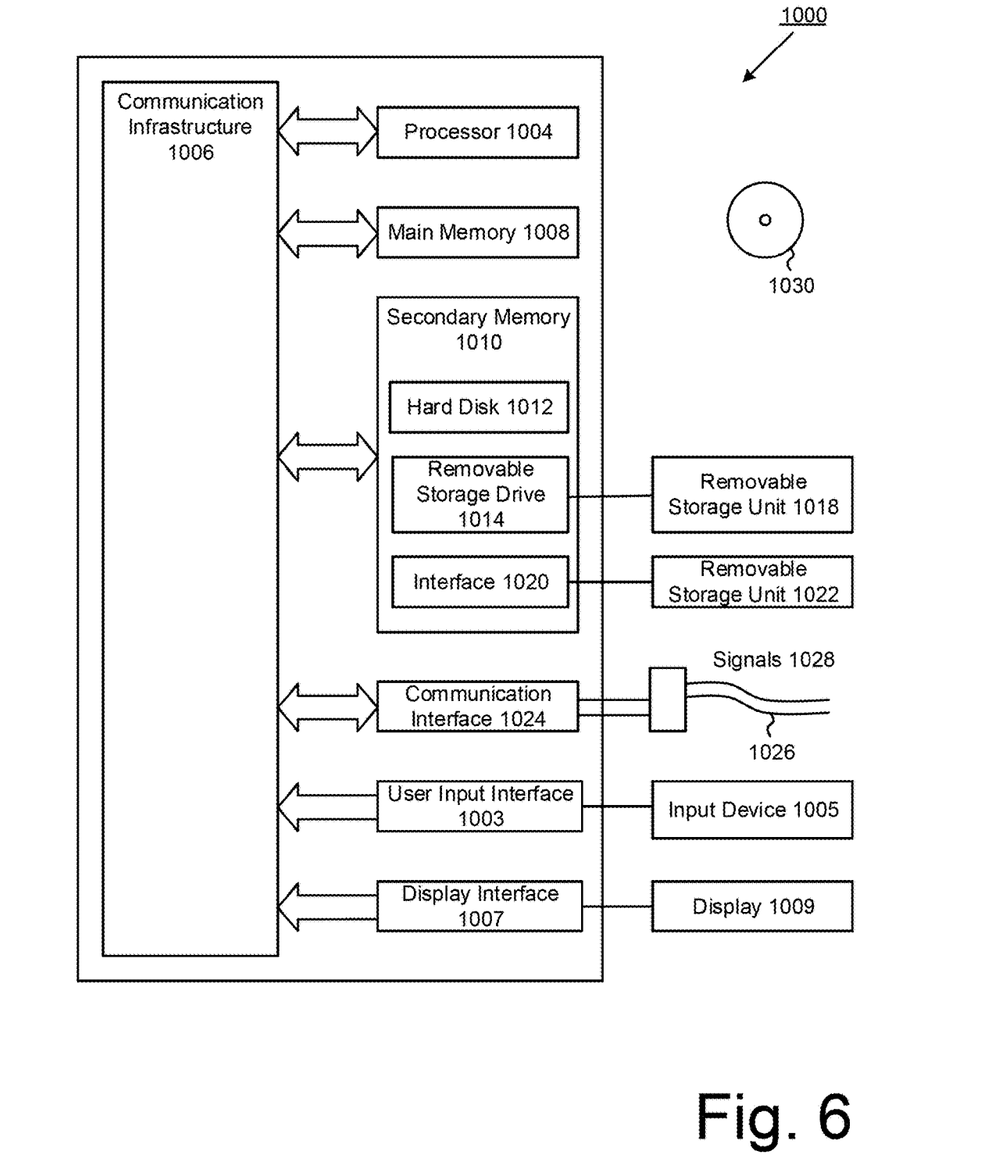
FIG. 6 is a diagram of an example of a computer system on which one or more of the functions of the described embodiments may be implemented.

The devices and modules described herein, such as the AR device, the binding data generating module and the input interface module, may be implemented by a computer system or systems, such as computer system 1000 as shown in FIG. 6. Embodiments of the present invention may be implemented as programmable code for execution by such computer systems 1000.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Computer system 1000 also includes a user input interface 1003 connected to one or more input device(s) 1005 and a display interface 1007 connected to one or more display(s) 1009, which may be integrated input and display components. Input devices 1005 may include, for example, a pointing device such as a mouse or touchpad, a keyboard, a touchscreen such as a resistive or capacitive touchscreen, etc.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Various software implementations are described in terms of this exemplary computer system. Alternative embodiments may be implemented as control logic in hardware, firmware, or software or any combination thereof.

Further Embodiments, Alternatives and Modifications

It will be understood that embodiments of the present invention are described herein by way of example only, and that various changes and modifications may be made without departing from the scope of the invention.

For example, it will be appreciated that although the respective processes and associated processing modules are described as separate embodiments, aspects of the described embodiments can be combined to form further embodiments. For example, alternative embodiments may comprise one or more of the binding data generation and verification aspects described in the above embodiments. As yet another alternative, the binding data generating and/or input interface modules may be provided as one or more distributed computing modules or processing services on a remote server that is in communication with the AR device via the data network. Additionally, as those skilled in the art will appreciate, the binding data generating module and/or input interface module functionality may be provided as one or more application programming interfaces (API) accessible by an application program executing on the AR device, or as a plug-in module, extension, embedded code, etc., configured to communicate with an application program on the AR device.

In a further embodiment additional binding data may be provided by a series of trusted third parties in a nested authentication arrangement which may be useful in cases where the originator of the original document is not expected to be known to the intended recipient. In such an alternative, the document file and the originator's binding data containing associated original fingerprint data are combined together and the hash of this composite file is calculated, with the result denoted as a second fingerprint data for subsequent implanting into a second layer of binding data, for example by a intermediary trusted third party. It is apparent that the nesting procedure may continue resulting in a series of trusted third parties authenticating previously authenticated composite files, producing respective layers of binding data, each conveying implanted fingerprint data authenticating the previous composite file so that at the $j^{th}$ step, the $(j-1)^{th}$ trusted third party produces one or more binding data (j) each of which include corresponding fingerprint data.

As another alternative, one part of the digital fingerprint derived from the data file may be appended to the original data file and another part of the digital fingerprint may be implanted into the binding data as described in the embodiments above.

In the embodiments described above, the invention is described in the context of data communicated between corresponding applications on respective devices. It is appreciated that the invention can also be implemented in a wide number of different types of applications that enable and/or facilitate secured access to digitally represented information, such as cloud-based information services, internet banking, digital rights management, personal information databases, blockchain distributed ledgers, cryptocurrencies, social networking, point of sale transactions, e-mail applications, secure ticketing, message services, digital broadcasting, digital communications, wireless communications, video communications, magnetic cards and general digital storage.

It will be understood that embodiments of the present invention are described herein by way of example only, and that various changes and modifications may be made without departing from the scope of the invention. Further alternative embodiments may be envisaged, which nevertheless fall within the scope of the following claims.

The invention claimed is:

1. A method of creating binding data for a data file, the method performed by a computer system of a user, comprising:
deriving an input sequence of data elements based at least on information from the data file;
outputting, on a display, a graphical representation of input regions corresponding to the input sequence of data elements, superimposed on captured image data including a visible feature of the user associated with the data file;
capturing user input of each data element of the input sequence by tracking the visible feature through the corresponding input regions, and
creating the binding data from at least some of the captured images as the visible feature is tracked through the input regions.

2. The method of claim 1, wherein capturing user input of each element of the input sequence comprises:

outputting a prompt of an element from the input sequence;
detecting the visible feature in the captured image data;
computing two-dimensional coordinates of the visible feature detected in the captured images; and
identifying the element of the input sequence corresponding to the computed two-dimensional coordinates of the visible feature.

3. The method of claim 2, wherein identifying the element of the input sequence comprises determining that the computed two-dimensional coordinates of the visible feature is within an associated input region of the graphical representation.

4. The method of claim 3, wherein identifying the element of the input sequence comprises determining that the computed two-dimensional coordinates of the visible feature remain within the associated input region of the graphical representation for a defined duration.

5. The method of claim 1, wherein the binding data comprises at least one captured image corresponding to user input of each data element of the input sequence.

6. The method of claim 1, wherein the input sequence of data elements is derived by one of extracting a portion of the information from the data file or calculating derived information from the data file using a defined mathematical function.

7. The method of claim 1, wherein each element comprises one or more of alphanumeric characters, symbols, and icons.

8. The method of claim 7, wherein each element represents a respective plurality of bits derived from the data file.

9. The method of claim 8, wherein each element is retrieved from a lookup table, where a symbol or sequence of symbols is used to describe said respective plurality of derived bits.

10. The method of claim 1, wherein the data file is a cryptographic key, and wherein a portion of said cryptographic key is implanted into said binding data.

11. The method of claim 10, further comprising verifying the implanted portion of the cryptographic key and the identity of the entity associated with the cryptographic key from said binding data, before allowing encryption or decryption of data using said received cryptographic key.

12. The method of claim 1, further comprising outputting, on the display, a graphical element at the tracked location of the visible feature, wherein the graphical representation of input regions is output over the graphical element.

13. The method of claim 12, wherein the visible feature is a nose of the user's face, and wherein the graphical element is generated based on the size and shape of the user's face.

14. Apparatus An apparatus comprising a memory and one or more processors configured to create binding data for a data file, by:
deriving an input sequence of data elements based at least on information from the data file;
outputting, on a display, a graphical representation of input regions corresponding to the input sequence of data elements, superimposed on captured image data including a visible feature of a user associated with the data file;
capturing user input of each data element of the input sequence by tracking the visible feature through the corresponding input regions, and
creating the binding data from at least some of the captured images as the visible feature is tracked through the input regions.

15. The apparatus of claim 14, wherein the capturing of user input of each element of the input sequence comprises:
   outputting a prompt of an element from the input sequence;
   detecting the visible feature in the captured image data;
   computing two-dimensional coordinates of the visible feature detected in the captured images; and
   identifying the element of the input sequence corresponding to the computed two-dimensional coordinates of the visible feature.

16. The apparatus of claim 14, wherein the binding data comprises at least one captured image corresponding to user input of each data element of the input sequence.

17. The apparatus of claim 14, wherein the one or more processors are further configured to output, on the display, a graphical element at the tracked location of the visible feature, wherein the graphical representation of input regions is output over the graphical element.

18. A non-transitory computer-readable medium comprising computer-executable instructions, that when executed, create binding data for a data file by performing the following:
   derive an input sequence of data elements based at least on information from the data file;
   output, on a display, a graphical representation of input regions corresponding to the input sequence of data elements, superimposed on captured image data including a visible feature of the user associated with the data file;
   capture user input of each data element of the input sequence by tracking the visible feature through the corresponding input regions, and
   create the binding data from at least some of the captured images as the visible feature is tracked through the input regions.

19. The non-transitory computer-readable medium of claim 18, wherein the capturing of the user input of each element of the input sequence comprises:
   outputting a prompt of an element from the input sequence;
   detecting the visible feature in the captured image data;
   computing two-dimensional coordinates of the visible feature detected in the captured images; and
   identifying the element of the input sequence corresponding to the computed two-dimensional coordinates of the visible feature.

20. The non-transitory computer-readable medium of claim 18, wherein the binding data comprises at least one captured image corresponding to user input of each data element of the input sequence.

* * * * *